United States Patent
Yajima (12)

(10) Patent No.: US 6,180,148 B1
(45) Date of Patent: *Jan. 30, 2001

(54) METHOD FOR COOKING FRESH NOODLES IN A MICROWAVE OVEN

(75) Inventor: Mizuo Yajima, Tokyo (JP)

(73) Assignee: Asama Chemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/863,715

(22) Filed: May 27, 1997

(30) Foreign Application Priority Data

| May 28, 1996 | (JP) | 8-154802 |
| Jun. 20, 1996 | (JP) | 8-178667 |
| Aug. 22, 1996 | (JP) | 8-239905 |
| Sep. 20, 1996 | (JP) | 8-269114 |

(51) Int. Cl.[7] .................. A23L 1/01; A23L 1/16
(52) U.S. Cl. .................. 426/392; 426/397; 426/402; 426/403; 426/412

(58) Field of Search .................. 426/86, 107, 112, 426/113, 114, 115, 118, 234, 241, 243, 392, 403, 412, 557, 451, 589, 520, 397, 402

(56) References Cited

U.S. PATENT DOCUMENTS 4,803,088 * 2/1989 Yamamoto et al. ............ 426/557 X
5,695,801 * 12/1997 Oh ........................................ 426/325

* cited by examiner

*Primary Examiner*—Milton Cano
(74) *Attorney, Agent, or Firm*—Flynn, Thiel, Boutell & Tanis, P.C.

(57) ABSTRACT

As an object, the present invention provides a noodle product, process for production and method for cooking, which allows the noodles to be cooked easily by heating with the use of a microwave oven, and thereby, the mouth-feel and taste of fresh noodles can be reproduced. The noodle product of the present invention comprises noodles and a container or bag containing the noodles, the container and bag being made of heat-resistant resin or aluminum and suitable for use in a microwave oven.

4 Claims, No Drawings

METHOD FOR COOKING FRESH NOODLES IN A MICROWAVE OVEN

BACKGROUND OF THE INVENTION

1. Field of the Invention

The present invention relates to a process for producing noodles and a method for cooking said noodles.

2. Prior Art

Conventional ready-to-eat noodles include the original fried ready-to-eat noodles and the latest ready-to-eat fresh-type noodles which can be stored for a long period of time (LL noodles). However, these noodles, even those called the 'fresh-type' are prepared by subjecting fresh noodles to a heat process such as boiling, steaming, frying and drying after α-modification for long-term storage and ready-to-eat abilities. Therefore, they fail to sufficiently reproduce the mouthfeel characteristics of fresh noodles.

Recently, microwave ovens have been popularized and used not only for thawing and heating but for cooking. Since they are convenient, that is, they require shorter period of time for cooking, they are widely utilized, particularly for cooking of a small amount of materials, heating and cooking of single meals. For noodles, they have been used only for the thawing of frozen noodles and thawing and heating of frozen or chilled chow mein. As ready-to-eat fried noodles, there have been some products to be heated with hot water added to the container in a microwave oven (DENGEKI RAMEN, manufactured by Ace-Cock Co. Ltd.), which have a mouthfeel similar to those of the aforementioned heat-processed products. Therefore, development of ready-to-eat noodles having mouthfeel characteristics of ordinary fresh noodles has been expected.

Conventionally, to meet the demand to shorten the cooking time, fresh noodle products have been produced by thinning noodle strands or by adding more water, but there have not been known examples wherein such fresh noodles are contained in a container to be served, and directly cooked in a microwave oven.

Microwave ovens have been used not only for thawing and heating but for cooking. Since they are convenient, that is, they require shorter period of time for cooking, they are widely utilized, particularly for cooking of a small amount of materials, heating and cooking a plate. To provide such a use, noodles, for example, ready-to-eat fried noodles, ready-to-eat noodles, prepared by drying after applying an α-treatment, frozen noodles are commercially available. However, all of the noodles have been subjected to heat treatment, and there have been no fresh noodles known which are prepared without heat treatment and become edible by cooking with a microwave oven.

On the other hand, for production of noodles, the present inventor has proposed to add wheat protein comprising gliadin as a main ingredient (for example, JP-A-6-105662 and JP-A-7-289187). However, noodles prepared by adding gliadin to ordinary flour cannot easily become edible noodles by cooking with rapid heat (for 1 to 3 minutes), which is one of the characteristics of cooking using a microwave oven.

There are many proposals to compound modified starch (for example, JP-A-3-252147). Using a large amount of modified starch (not less than 30% by weight) attains gelatinization in a short time, but the resulting noodle strands become fragile during production and storage of the fresh noodles. To prevent such problems, there are methods wherein gluten is added, or noodle strands are allowed to become partly α-starch by heat sterilization, to improve storage stability.

Conventionally, for the production of noodles, the addition of oils and fats or emulsifiers has often been carried out to improve the quality of the noodles. However, there have been no examples known for that of fresh noodles to be cooked in a microwave oven. The purpose of adding oils and fats and emulsifiers is mainly to improve the moldability and stretchability of the noodles and to prevent drying.

Conventionally, microwave ovens have been used for thawing frozen food and heating cold food, rarely for heat-cooking. In particular, microwave ovens have been rarely used for boiling food, for example, boiling noodles.

In general, when noodles are boiled using pans or the like, boil-over can be prevented by controlling the heating power while monitoring the boiling conditions. However, when microwave ovens are used for such cooking, the output cannot be controlled by monitoring boiling conditions, which is one of the greatest disadvantages of microwave ovens. Accordingly, boiling noodles using a microwave oven may be accompanied with boil-over or the like, causing many problems, for example, a risk of scalding and contamination due to boil-over.

A seasoning for cooking in a microwave oven, "RENJI-DE-ORYORI" has been marketed from Shimaya KK. This product requires relatively large amounts of water in a bag made of a resin to boil food in a microwave oven. To prevent boil-over, the product employs a bag to maintain a big space above the surface of the hot water, the top edge of the bag being folded to prevent boil-over. Accordingly, the bag cannot be served for a meal as it is, and after cooking, another operation is required, that is, the content should be transferred to another container. Thus, such a product is disadvantageously less convenient.

Problems to be Solved by the Invention:

An object of the present invention is to provide a process for producing ready-to-eat noodles which can be conveniently cooked by heating in a microwave oven, and reproduce the mouthfeel and taste characteristics of fresh noodles, and a method for cooking such ready-to-eat noodles.

However, in the aforementioned method in which gluten is added, the products require a longer time for boiling, and a method which comprises changing a starch to partially an α-starch results in products with a mouthfeel different from that of the original noodles prepared using flour. The object of the present invention is to provide fresh noodles to be cooked in a microwave oven, said noodles having a good moldability and being cooked to have a mouthfeel of regular noodles by rapid cooking using a microwave oven.

However, the addition of not less than 0.1% by weight of oils and fats and/or emulsifiers will cause problems, for example, the noodles may become pasty extremely quickly after boiling by heating using a general gas heater, electric heater or the like.

The object of the present invention is to provide a process for producing fresh noodles to be cooked in microwave ovens which are free from the aforementioned problems and can become edible by rapid cooking using microwave ovens.

Accordingly, the object of the present invention is to provide a process for producing noodles to be conveniently cooked in a microwave oven, wherein the noodles can be safely boiled without causing boil-over by heating in a microwave oven.

SUMMARY OF THE INVENTION

The present inventor has studied intensively to solve the above problems. As a result, the present inventor has found that fresh noodles placed in a container or a bag suitable for use in a microwave oven is heated with hot water added thereto in a microwave oven to provide noodles retaining their original mouthfeel in a very short time, and thus the boiled noodles retain their firmness for a longer period of time, because they are heated with less penetration of hot water into the noodle strands upon heating in a microwave oven in contrast with those boiled in a pan using a gas heater, electric heater or the like wherein hot water penetrates into noodle strands. In addition, fresh noodles having a higher moisture content can be boiled in a shorter period and reproduce the taste characteristics of original fresh noodles. Thus, the present inventor has attained the present invention The present inventor has studied intensively to attain the above objects and has found that modified starch having a gelatinization initiation temperature of 50 to 60° C. and wheat protein containing gliadin as a main ingredient, or an α-starch are added to powdery starting materials to prepare a noodles sheet, making fresh noodles edible, retaining a mouthfeel similar to fresh noodles, by cooking in a short time by a microwave oven, and, thus, has attained the present invention.

The present inventor has studied intensively to attain the above objects. As a result, we have found that compounding oils and fats and/or emulsifiers into fresh noodles will improve the rate of water-absorption into noodle strands, even upon heating using a microwave oven, which is accompanied with less water-absorption, and has attained the present invention.

The present inventor has studied intensively to overcome the above problems. As a result, the present inventor has found that by coating an antifoamer or adhering an antifoamer-containing sheet on the lid of a container suitable for use in a microwave oven, water can be prevented from boiling over when the noodles are boiled using a microwave oven, and has attained the present invention. Further, the present inventor has also found that by providing the container with an inner lid having openings and/or slits, or providing the lid with openings and/or slits, the boil-over of water can be similarly prevented.

DETAILED DESCRIPTION OF THE INVENTION

The present invention relates to a process for producing ready-to-eat fresh noodles which is characterized by placing fresh noodles in a heat-resistant resin container or a bag suitable for use in a microwave oven or in an aluminum container. The present invention further relates to a method for cooking ready-to-eat fresh noodles which comprises pouring hot water into the ready-to-eat fresh noodles in a heat resistant resin container or a bag suitable for use in a microwave oven or an aluminum container and heating in a microwave oven.

In addition, the present invention relates to a process for producing fresh noodles to be cooked in a microwave oven which is characterized by adding 10 to 50% by weight of modified starch having a gelatinization initiation temperature of 50 to 60° C. and 0.5 to 5% by weight of wheat protein containing gliadin as a main ingredient to powdery starting materials to produce a noodles sheet.

In addition, the present invention relates to a process for producing fresh noodles to be cooked in microwave ovens, which is characterized by compounding 0.1 to 10% by weight of oils and fats and/or emulsifiers, based on flour.

In addition, the present invention relates to a process for the production of a noodle product to be cooked in a microwave oven, which is characterized by placing the noodles in a molded container for the food to be cooked in a microwave oven, the inner surface of the lid of the molded container being partially or entirely coated with an antifoamer, or adhered with an antifoamer-containing sheet. Moreover, the present invention relates to a process for the production of noodle products to be cooked in a microwave oven, which is characterized by placing noodles in a molded container for food to be cooked in a microwave oven which has an inner lid with openings and/or slits. Further, the present invention relates to a process for the production of noodle products to be cooked in a microwave oven, which is characterized by placing noodles in a molded container for food to be cooked in a microwave oven which has a lid with openings or slits.

The present invention relates to a noodle product which comprises noodles and a container or a bag containing the noodles, wherein said container and bag are made of a heat-resistant resin or aluminum and are suitable for use in a microwave oven.

The noodles are fresh or heat-treated noodles.

For fresh noodles, they preferably contain flour and modified starch as powdery starting materials. Preferably, the fresh noodles have a water content of 30 to 50% by weight and comprise at least one selected from the group consisting of natural antibacterial components, antibacterial amino acids, antibacterial acids, salts thereof and a water activity controller. The fresh noodles further comprise 10 to 50% by weight of a modified starch having a gelatinization initiation temperature of 50 to 60° C., 0.5 to 5% by weight of wheat protein containing gliadin as a main component and, further, 1 to 10% by weight of an α-starch, based on the powdery starting materials. Alternatively, the fresh noodles comprise the powdery starting materials having flour and 0.1 to 10% by weight of either oils and fats or emulsifiers based on the powdery starting materials.

The oils and fats contained in the fresh noodles may be suitably powdery or emulsified oils and liquid fats.

The noodles preferably comprise an oxygen scavenger or sustained release alcohol preparation.

The present invention further provides a noodle product which comprises noodles and a container, wherein said container is a molded container for food to be cooked in a microwave oven, which has inner side walls partially or entirely coated with an antifoamer or has a lid with an antifoamer-containing sheet adhered thereto.

The lid preferably has openings and/or slits. The antifoamer preferably is a silicone resin, glycerol, polyglycerol fatty acid ester, sucrose fatty acid ester or sorbitan fatty acid ester. The molded container is preferably made of a foamed resin.

The container or the bag is made of a heat resistant polystyrene paper, a polystyrene paper with a heat resistant resin coated on either or both surfaces thereof, or a polystyrene paper with a heat resistant film laminated thereon. In particular, it is preferably a molded container for food to be cooked in a microwave oven.

The container may have an inner lid having openings and/or slits. Both or either surface of said inner lid is preferably coated partially or entirely with an antifoamer, or adhered with an antifoamer-containing sheet.

Water may be added to the noodle product and it is cooked and heated in a microwave oven. During heating, foam may contact with the outer and inner lids and be defoamed by the antifoamer. The slits in the lid prevent boil over.

The present invention is especially characterized by the combination of fresh noodles and a container and cooking in a microwave oven.

The present invention further provides a process for producing a noodle product which comprises placing noodles in a container or a bag made of a heat resistant resin or aluminum which is suitable to be used in a microwave oven, followed by either packaging by inert gas substitution or vacuum packaging.

The present invention further provides a process for producing a noodle product which comprises placing noodles in a molded container for food to be cooked in a microwave oven, said container having an inner wall partially or entirely coated with an antifoamer or having a lid adhered with an antifoamer-containing sheet, and either packaging by inert gas substitution or vacuum packaging. The storage-ability may be improved by evacuating oxygen gas, for example by substitution with nitrogen gas.

The present invention further provides a method for cooking noodles which comprises adding hot water into the aforementioned container or bag containing noodles and heating in a microwave oven. Preferably, in the above method, noodles may be transferred into another ceramic container from the container or the bag, and heated in a microwave oven.

In the present invention, "fresh noodles" means non-dried wheat products having a form such as a sheet or rope shape, and which are not cooked by heating or the like.

In the present invention, "ready-to-eat fresh noodles" means those placed in a container which can be cooked in a short period of time, for example, by heating in a microwave oven. According to the present invention, the original mouthfeel characteristics of fresh noodles can be reproduced by such a cooking method.

The fresh noodles used in the present invention include Chinese noodles, Japanese Soba, chow mein, fresh spaghetti, udon-noodles, etc., which can be produced according to the conventional methods without limitation.

In the present invention, "containers or bags suitable for use in a microwave oven" means those free from toxic ingredients exuding from the resin or breakage or remarkable deformation upon heating with hot water added thereto in a microwave oven for a minute or longer. A heat-resistant resin container or bag suitable for use in a microwave oven includes those utilizing, for example, a high-temperature crystallized polyester resin (resistant at about 270° C.), high-temperature crystallized polypropylene resin (resistant at about 160° C.), heat resistant polystyrene paper prepared by high density foaming of polystyrene (foaming degree: 3 to 4 times; resistant at about 105° C.), polystyrene sheet prepared by middle density to low density foaming (foaming degree: 5 to 10 times) with a polystyrene film coated or laminated on the surface thereof (resistant at around 105° C.), and the above resins mixed with incombustible particles or powders such as ceramics, calcium, diatomaceous earth, and said bags further include heat-resistant bags made of polypropylene, or a combination of polyethylene and nylon, in addition to the above materials. Among them, the latter three materials exemplified for containers are cheap and preferred. Bags made of heat resistant polystyrene paper are more preferred.

Further, "alumi" means aluminum containers herein used and include those commercially available cup-shaped containers made of aluminum foil. Bags made of aluminum foil laminated or coated with resin film can be also used.

The shapes and capacity of containers made of the heat-resistant resin and aluminum are not limited. However, cup- or bowl-shaped containers may be preferably used. The capacity of the containers are generally 400 to 1,000 ml. Of course, such containers preferably have lids such as those made of resin film having a similar heat resistance. Such a bag is preferably self-supported, such as a "standing pouch".

Molded containers for food to be cooked in a microwave oven used in the present invention are cup-shaped containers such as bowls made from materials which are free from toxic ingredients exuding from the resin or breakage or remarkable deformation upon heating at a temperature higher than 100° C. For example, bowls made of paper, glass, ceramics or cup-shaped containers made of a foamed sheet laminated with a thick polystyrene or polyester film.

Among them, bowl-like shaped containers made of heat-resistant polystyrene paper consisting of a foamed polystyrene sheet, both surfaces of which are laminated with polystyrene film, polypropylene film or polyester film, are preferred. Such containers have advantages, for example, the outer surface of the bowl does not become too hot upon the addition of hot water and heating in a microwave oven, and the heating time in a microwave oven can be reduced due to their excellent heat retaining property.

The lid of the molded container for food to be cooked in a microwave oven used in the present invention may be those satisfying conditions similar to those for the container. For example, a sheet with a resin-coating or laminate, polystyrene sheet, polyester sheet, polypropylene sheet can be molded into lids. Those formed from biaxially oriented polystyrene sheets are preferred.

Antifoamers used in the present invention include emulsifiers such as a silicone resin, glycerol or polyglycerol fatty acid ester, sucrose fatty acid ester, sorbitan fatty acid ester, but the antifoamers of the present invention are not limited to these kind. For emulsifiers, those having an antifoaming activity and HLB not more than 5 are preferred. To emulsify silicone, those with a high HLB are employed.

Coating of an antifoamer or adhering antifoamer-containing sheet is performed by a method which comprises coating an antifoamer directly on the entire surface of the lid or the inner lid; a method wherein an antifoamer is coated around openings and/or slits; a method wherein an antifoamer-containing sheet is adhered to the entire surface or around openings and/or slits. It is preferred to coat an antifoamer or adhere an antifoamer-containing sheet around the openings and/or slits. For the inner lid, an antifoamer may be applied on either the top or bottom surface thereof. An antifoamer-containing sheet consists of a paper or resin sheet impregnated or coated with an antifoamer.

The amount of antifoamer to be coated or content of antifoamer may vary depending on the area to be coated or adhered, and not limited. Preferably, the amount is not less than 5 mg/100 cm$^2$.

The object of the present invention can be also attained by providing openings and/or slits on the inner lid. When an inner lid is provided, the materials may satisfy the conditions similar to those for the aforementioned lid. The shapes are not limited. The openings and/or slits serve to vent steam when the contents are boiling upon heating in a microwave oven, to prevent boil-over. When it is used in combination with a lid coated with an antifoamer or adhered with an antifoamer-containing sheet, it will have greater effect. The shape of the slits may be, for example, cross-shaped, U-shaped, etc.

The openings and/or slits made on the inner lid may be, for example, for the openings, 2% to 50% of the total area of the inner lid, area of single opening being not less than 0.2 cm². The slits may have an edge not less than 5 mm and not more than 50% of the diameter of the lid. For the U-shaped slit, 4 to 6 U-shaped slits (1 to 3 cm length) may be provided. For the openings, 1 to 8 openings preferably having an area of 0.5 to 1 cm 2 may be provided. The length and number of such openings or slits are not limited.

The present invention further provides a process for producing a noodle product to be cooked in a microwave oven which is characterized by placing noodles into a molded container for food to be cooked in a microwave oven which has a lid with openings and/or slits. For boiled noodles, which are low foaming, a container for food to be cooked in a microwave oven is used with a lid having openings and/or slits, to secure safety without coating an antifoamer on the lid or without using an inner lid. However, by providing an inner lid with openings and/or slits, boil-over can be sufficiently prevented.

Further, the openings and/or slits are provided both on the lid and inner lid, and an antifoamer is coated or antifoamer-containing sheet is adhered partially or entirely on the inner surface of the lid or partially or entirely on either or both surfaces of the inner lid to sufficiently attain the object of the present invention and sufficiently prevent boil-over when fresh noodles are contained therein. The openings and slits of the present invention are different from steam ports generally provided at the engagement portion of the lid of the container of the ready-to-eat noodles and the like.

In the present invention, the combination of the antifoamer and the lid and/or inner lid with the openings and/or slits provides a greater boil-over prevention effect compared with that obtained when they are solely employed. Such a combination is encompassed within the present invention.

When noodles are placed in the container of the present invention, the present invention has a greater effect on fresh noodles. For example, fresh udon noodles, fresh Chinese noodles, fresh Japanese buckwheat noodles, fresh spaghetti, fresh pasta, etc. Further, cooked noodles prepared by, for example, boiling or steaming the aforementioned noodles, ready-to-eat noodles prepared by sterilization of boiled, steamed or fried noodles which can be stored for a long period of time or dried noodles may be contained therein.

In addition, not only the aforementioned fresh noodles but cooked noodles or ready-to-eat noodles may be boiled by heating in a microwave oven rather than using a gas heater, electric heater or the like to shorten the heating time and prevent the absorption of water into the noodle strands, thereby safely providing noodles having a suitable texture in a short period of time.

For cooking according to the method of the present invention, noodles in a microwave oven, noodles, as well as cold or hot water or soup, are placed in a container and heated. The heating time is not limited and varies depending on the temperature of the liquid to be added and type of noodles.

Moreover, fresh noodles can be directly placed in a container or a bag without being packaged. Alternatively, noodles may be packed in another resin bag, which is then placed in a resin bag. Preferred packaging is that which contains noodles as well as an oxygen scavenger or a sustained release alcohol preparation in a resin bag or inert gas replacement packaging or vacuum packaging, which is excellent for long-term storage of fresh noodles. Of course, when fresh noodles are directly placed in a container or a bag, an oxygen scavenger and/or a sustained release alcohol preparation may be packaged in the same container.

The fresh noodles used in the present invention can contain modified starch in addition to flour as powdery starting materials. Such modified starch includes, for example, potato starch, tapioca starch, sago starch, corn starch, wheat starch and rice starch subjected to a chemical modification such as esterification with an organic acid, phosphoric acid cross linking, hydroxypropylation, etherification, oxidation; processed starch subjected to a physical treatment such as α-modification by heating or partial solation by wet heating, etc. The types and means for processing are not limited. Processed starch or modified starch which begins to gelatinize at 50 to 60° C. is preferred.

When the modified starch is used as one of the ingredients in the powdery starting materials, the amount is not limited depending on the replacement amount for flour, but preferably is 15 to 50% by weight. Depending on the replacement amount, protein such as gluten, gliadin, glutenin, egg albumen, milk albumin, casein or α-starch may be added for reinforcement of bonding.

Modified starch means that prepared from raw starch by a treatment such as baking (baked starch), decomposition (dextrin) or chemical modification. The treatment method and starting starch are not particularly limited as long as a modified starch having a gelatinization initiation temperature of 50 to 60° C. is subjected to the chemical modification. For example, the starting starch includes tapioca starch, corn starch, potato starch, wheat starch. Chemical modification includes esterification with an organic acid such as acetic acid; oxidation with a hypochlorite; hydroxypropylation, etherification, etc. Hydroxypropylated starch such as tapioca starch, corn starch or wheat starch is preferred because of their lower effect on solubility and smell, as well as gelatinization temperature.

Gliadin is a mixture of proteins extracted from wheat gluten with 70% by volume ethanol aqueous solution. Wheat protein containing gliadin as a main ingredient used in the present invention may be extracted from raw gluten or gluten powder separated from wheat flour by any extraction method, for example, by 50 to 70 vol % aqueous ethanol solution extraction, 10 to 30 vol % aqueous isopropylalcohol solution extraction, 20 to 50 vol % aqueous acetone solution extraction, or acidic aqueous ethanol solution extraction wherein an organic acid such as lactic acid, citric acid, malic acid, acetic acid or salts thereof is added to a low concentration (5 to 20 vol %) aqueous ethanol solution to adjust pH 3.5 to 5.5.

According to this extraction, a dry extract containing 50 to 100% by weight of gliadin can be generally obtained. In the present invention, among them, an extract obtained by acidic aqueous ethanol solution extraction is preferred, which contains not less than 70% by weight gliadin in dry powder.

Modified starch and gliadin are simultaneously added to afford bonding to fresh noodle strands and shorten the time required for boiling. Thus, fresh noodles suitable to be cooked in a microwave oven can be obtained.

According to the present invention, in the total powdery starting materials containing flour, buckwheat flour, starch, wheat protein containing gliadin as main ingredients, and modified starch, the modified starch is added so as to be 10 to 50% by weight. When the amount of the modified starch is less than 10% by weight, the resulting noodles disadvantageously require a long time for cooking in a microwave oven. On the other hand, when the amount exceeds 50% by weight, the resulting noodle strands become fragile, may be broken during storage and suffer a remarkable degradation in mouthfeel and flavor. The preferred amount is 20 to 50% by weight. More preferably, the amount is 30 to 50% by weight for udon noodles, which require relatively longer times for boiling, 20 to 40% by weight for Japanese buckwheat noodles and Chinese noodles, which require relatively shorter times for boiling.

Wheat protein containing gliadin as a main ingredient is added to the powdery starting materials so as to be 0.5 to 5% by weight. In amounts less than 0.5% by weight in the powdery starting materials, the bonding effect of noodle strands may not be expected. In amounts exceeding 5% by weight, the resulting noodles have a mouthfeel different from that of the original noodles. The preferred amount of wheat protein to be added, which contains gliadin as a main ingredient, is 1 to 4% by weight. The method for addition is not particularly limited and they may be mixed as powder with other powdery starting materials.

In the present invention, an α-starch is compounded in the noodle dough to assist the bonding during the production of noodles, and to increase the water to be added during production of the noodles, contributing to the reduction in time for boiling and providing more suitable noodles to be cooked in a microwave oven. The α-starch is not limited by the starch starting material and method for bringing a starch to be an α-starch. For example, starch starting materials include tapioca starch, corn starch, potato starch, wheat starch, etc. Methods for bringing to a starch to be an α-starch include a method comprising simultaneously bringing a starch to be an α-starch and drying starch sludge dispersed in water using a drum dryer; a method wherein a powdery α-starch is directly prepared from starch using an extruder; a method wherein a solution is prepared by dispersing starch in water, heating and drying an α-starch using a spray dryer. Preferably, an α-starch prepared from corn starch using a drum dryer is used with respect to the workability of bringing a starch to be an α-starch and characteristics of the starch powder (adhesiveness, etc.).

The amount of the α-starch to be added is preferably 1 to 10% by weight, more preferably 1 to 6% by weight of the powdery starting materials. Particularly, for Chinese noodles which require relatively smaller amounts of modified starch, the amount is 1 to 3% by weight, and for Japanese buckwheat noodles and Udon noodles which require more modified starch, the amount is 4 to 6% by weight. The preferred method for addition is powder-powder mixing, like the modified starch.

For ready-to-eat fresh noodles, keeping the quality of the fresh noodles stable during commercial activities will have a good effect on the subsequent reproduction of mouthfeel. Accordingly, the fresh noodles of the present invention are preferably compounded with one or more members selected from the group consisting of natural antibacterial ingredients, such as ethanol, protamine, polylysine, hop extracts, capsicum extracts, chitin, chitosan, wasabi extracts, lysozyme, decomposition products of pectin, bacteriocin, burned oyster- or egg-shell or bone; natural antibacterial amino acids such as glycine, alanine, threonine; natural antibacterial acids and salts thereof such as acetic acid, fumaric acid, adipic acid, lactic acid, citric acid, malic acid, phosphoric acid, tartaric acid, gluconic acid, gluconodeltalactone, succinic acid, carbonic acid and their salts with sodium, potassium, calcium and magnesium; a water activity regulator having a function of reducing water activity such as glycerol, sugar-alcohol, common salt, sugar and propylene glycol, to improve the storage stability.

The amount of the above materials to be added is not particularly limited, but, for ethanol, the preferred amount is 1 to 5% by weight of the total weight of noodles; for antibacterial ingredients, 0.01 to 2% by weight based on powder; for the water activity regulator, 0.5 to 20% by weight, based on the powdery starting materials.

The means for adding said ingredients are not particularly limited. They may be mixed with the powdery material, or dissolved and dispersed in water for kneading. Methods in which liquid or water-soluble ingredients are dissolved in water for kneading, and others are mixed with the powdery starting materials are preferred.

Moreover, the aforementioned oxygen scavenger, sustained release alcohol preparation, inert gas replacement packaging, vacuum packaging or a combination thereof will further improve the storage stability.

In the present invention, the moisture content of the fresh noodles may be within that of the usual fresh noodles. Fresh noodles with a low moisture content requires a relatively longer heating time in a microwave oven. For example, when the moisture content is increased to 30 to 50% by weight, the heating time can be considerably shortened, thereby preventing the loss of firmness of the noodles upon boiling and closely reproduces the mouthfeel characteristic of fresh noodles. It is more effective to use the aforementioned modified starch as one of the powdery starting materials and to add a large amount of water. The moisture content means that of fresh noodles contained in a container.

Further, the fresh noodles can be prepared by compounding materials or additives which may be generally compounded in noodles. For example, grain flour such as buckwheat flour, rice flour, corn meal; animal and vegetable proteins such as egg albumen, milk protein, soybean protein; gums such as xanthan gum, guar gum, carrageenan, locust bean gum, curdlan, agar, konjak, gelatin, tamarind gum, pectin, durran gum, alginic acid or a salt thereof; oils and fats; emulsifiers such as glycerol fatty acid esters, sorbitan fatty acid esters, sucrose fatty acid esters, lecithin, enzymatically treated lecithin; common salt; kansui and kanfun. They can be used alone or in a combination of two or more of them. The kansui is a solution wherein kanfun is dissolved, and kanfun is an alkali mixture which comprises, for example, 30% of potassium carbonate, 59% of sodium carbonate, 7% of disodium hydrogenphosphate and 4% of sodium pyrophosphate.

The amount and means for the addition of this mixture are not particularly limited. For grain flour and starch, the amount to be replaced for flour is 5 to 50% by weight, and for others, 0.01 to 5% by weight based on the flour. The addition is preferably carried out by mixing with the flour except for common salts, kansui, kanfun, emulsifiers and gums.

The process for producing noodles may be according to the conventional methods by the steps of kneading, forming noodle sheets, mixing noodle sheets, maturing noodle sheets, rolling noodle sheets, cutting (making noodle strands) to prepare, for example, fresh noodles for Japanese buckwheat noodles, Chinese noodles. For udon noodles, the thickness of the noodle sheet before cutting is 2.5 to 1.5 mm to prepare fresh noodles.

In the process for producing noodles according to the present invention, the starting materials or additives which may be generally mixed with noodles can be mixed. For example, a grain flour such as buckwheat flour, rice flour, corn meal; a starch such as potato starch, tapioca starch, sago starch, corn starch, wheat starch, rice starch or a phosphate ester thereof or a modified starch such as those subjected to phosphoric acid cross linking, etherification, oxidation, which have a gelatinization initiation temperature not included within the range of the present invention; an animal and vegetable protein such as egg albumen, milk protein, soybean protein, gluten; gums such as xanthan gum, guar gum, carrageenan, locust bean gum, curdlan, agar, konjak, gelatin, tamarind gum, pectin, durran gum, alginic acid or a salt thereof; sugars or reducing sugars; polyols such as glycerol, propylene glycol; oils and fats; emulsifier such as glycerin fatty acid esters, sorbitan fatty acid esters, sucrose fatty acid esters, lecithin, enzymatically treated lecithin; acids such as citric acid, lactic acid, acetic acid, malic acid, tartaric acid, adipic acid, phosphoric acid, carbonic acid, hydrochloric acid, sulfuric acid and salts thereof with sodium, potassium, calcium, magnesium, etc. They can be used alone or in a combination of two or more of them.

The amount and means for the addition of this mixture excluding flour are not particularly limited. For addition, they can be mixed with flour, or dissolved in water. Preferably, they are mixed with flour.

Oils and fats used in the present invention may be any of animal oils and fats such as lard, beef tallow, milk fat, vegetable oils and fats such as palm oil, coconut oil, rice bran oil, soybean oil, rapeseed oil, corn oil, cotton seed oil, sesame oil, a mixture of these oils and fats, transesterification products, hydrogenated oils and fats and fractionated oils and fats. The types of oils and fats are not particularly limited.

When the aforementioned oils and fats are added to flour, they may be directly added to the flour or added to water for kneading depending on the forms of the oils and fats, and the means for addition are not particularly limited. It is preferred that such oils and fats can be mixed with starting flour and are excellent in workability and storage stability. In this regard, emulsified powdery oils and fats are preferred.

Emulsifiers include fatty acid esters of polyglycerol and glycerol, sucrose fatty acid ester, sorbitan fatty acid ester, soybean lecithin, egg yolk lecithin and enzymatically decomposed lecithin.

The means to add these emulsifiers include a method wherein the emulsifier is dissolved in oils and fats and added to powdery starting materials, a method wherein that emulsified oils and fats are added, a method wherein an emulsified oils and fats solution is added, a method wherein the emulsifier is directly added to powdery starting materials such as flour, and not limited to them. Preferably, it may be added during the preparation of an emulsion of oils and fats. A method which comprises adding powdery oils and fats which are prepared by drying this emulsion is more preferred.

In the present invention, the amount of oils and fats and/or emulsifier to be added to the powdery starting materials including flour is 0.1 to 10% by weight, preferably 0.1 to 5% by weight, as the total weight of oils and fats and/or emulsifiers. The ratio of oil and fat to emulsifier is not limited. When oils and fats are used, the ratio of oils and fats to emulsifier is preferably in the range from 1:1 to 100:1.

When an emulsifier is solely used, the amount may be within the range of from 0.1 to 10% by weight, preferably 0.1 to 2% by weight.

In the present invention, as mentioned above, the process for producing fresh noodles may be conducted according to the conventional processes. Among such fresh noodles, fresh spaghetti may be prepared by either using an extruder-type pasta-making machine or using a roll-type noodle-making machine with a round blade. Other noodles can be produced using machines conventionally used for producing noodles, for example, an atmospheric pressure kneader, a vacuum kneader, a vacuum noodle sheet-making machine, a roll-type noodle-making machine and an extruder-type noodle-making machine. A preferred machine is a combination of a vacuum kneader and a roll-type noodle-making machine, which can readily produce large amounts of water-containing noodles.

The noodles in the present invention include, for example, udon noodles, Japanese buckwheat noodles, Chinese noodles, etc. They are suitable as fresh noodles to be cooked in a microwave oven, by placing one or two bricks of noodles in a container suitable for use in a microwave oven, pouring cold or hot water into the container and cooking in a microwave oven.

Needless to say, fresh noodles of the present invention can be cooked in a shorter time using an ordinary gas heater compared with the ordinary fresh noodles.

The cooking process of the ready-to-eat fresh noodles of the present invention is not particularly limited. Particularly, according to the following cooking method of the present invention, cooked noodles having the excellent mouthfeel and taste characteristic of the noodles can be prepared by a simple method. That is, the aforementioned ready-to-eat fresh noodles in a container or a bag having hot water added thereto are heated in a microwave oven. Using hot water, the noodles can be cooked in a shorter period of time, producing different moisture distribution on the surface and inside of the noodle strands, reproducing the mouthfeel characteristic of noodles. That is, in the cooking method of the present invention, the noodle strands and water are simultaneously heated and boiled, in contrast with the method utilizing a gas heater, electric heater or the like, wherein the noodles are heated by hot water penetrating the noodle strands. Therefore, the noodles can be boiled while controlling the water absorption of the noodle strands. Especially, for Chinese noodles, the original mouthfeel (texture) can be attained. Thus, the mouthfeel characteristic of the noodles can be sufficiently reproduced.

For cooking methods using a microwave oven, for example, 250 g to 300 g of hot water is poured into a portion of fresh noodles for one person, (that is, 100 to 150 g). Using a generally popularized microwave oven with an output of 500 W, for Japanese buckwheat noodles and Chinese noodles, which require shorter times for boiling, hot water (950° C. or above) is poured into a container in which noodles have been placed, the container is covered with a lid, and heated in a microwave oven for 60 to 90 seconds, then concentrated soup was added thereto. Alternatively, hot water is removed, then fresh hot water and concentrated soup base are added. For udon noodles, which require relatively longer times for boiling, hot water is added to the container having noodles, the container is covered with a lid, then heated in a microwave oven for 60 to 90 seconds, and left to stand for 60 to 120 seconds. Subsequently concentrated soup base is added. Alternatively, hot water is once removed and fresh hot water is added with the concentrated soup base, then heated again in a microwave oven for 60 to 90 seconds. Furthermore, cold water can be used instead of hot water. In this case, the heating time becomes slightly longer.

As the method of cooking fresh noodles obtained by the present invention using generally popularized 500 W microwave ovens, conditions may vary whether fresh noodles are added to cold water or hot water (850° C. or higher) before heating. The case of Japanese buckwheat noodles or Chinese noodles, which requires relatively shorter time for boiling, and the case of udon noodles, which requires relatively longer time for boiling, are different. When Japanese buckwheat noodles, Chinese noodles, chow mein or the like, which require relatively shorter times for boiling, are boiled using hot water, hot water is poured into the container in which noodles have been placed, heated for about 60 seconds in a microwave oven, then concentrated soup base or the like is added thereto. Alternatively, hot water is once removed and concentrated sauce is added, or hot water is freshly added with concentrated soup base.

Further, when udon noodles or spaghetti, which requires relatively longer times for boiling, are boiled using hot water, hot water is poured in the container in which noodles have been placed, the container is covered with a lid, heated in a microwave oven for about 60 seconds, left to stand for about 60 seconds, then hot water is removed and concentrated sauce is added thereto. Alternatively, concentrated soup is added without removal of hot water, or fresh hot water as well as concentrated soup are added at the same time and heated again in a microwave oven for about 60 seconds.

When the noodles are cooked using cold water, cold water is poured into the container in which the noodles have been placed and heated in a microwave oven for about 4 minutes for Japanese buckwheat noodles, Chinese noodles, chow mein or the like, which require a relatively shorter time for boiling or for about 6 minutes for udon noodles, which requires relatively longer time for boiling, to which is added concentrated soup base, or the concentrated soup base is added after boiling water is removed, or fresh hot water and concentrated soup base are added.

The form of and way to serve the product of the present invention will be explained exemplifying an embodiment of Chinese noodles. 100 g of Chinese noodles prepared by the conventional method (thickness of strand=1.1×1.1 mm) packed in a polyethylene bag is placed in an about 800 ml volume bowl made of heat-resistant polystyrene paper, to which are added a soup base for the Chinese noodles and ingredients and covered with a lid to prepare a ready-to-eat fresh noodles product.

To eat the above product, firstly, remove all the contents of the container. Take out Chinese noodles from the bag and put them back in the container. Pour about 300 ml of hot water at 80 to 100° C. into the container, put a lid on and, after heating in a microwave oven (output 500 W) for 60 seconds (when hot water of 95° C. or higher is used), add the concentrated soup base and ingredients to the container containing said noodles. Alternatively, drain off the hot water contained in the container, then add concentrated soup base and ingredients and pour about 300 ml of hot water again to prepare the ready-to-eat product. Hot water to be poured and heated in a microwave oven should be at a high temperature, preferably not lower than 95° C. to prevent a reduction of temperature due to the difference in temperature between the hot water and fresh noodles, resulting in a reduction of heating time. Using an aluminum container, the aforementioned heating time in a microwave oven should be about 90 seconds.

In the above cooking process, an aspect of the present invention is explained wherein a container or a bag containing ready-to-eat fresh noodles is directly used for cooking in a microwave oven. The ready-to-eat fresh noodles according to the present invention require only heating with hot water in a microwave oven to produce good results. However, the noodles may be transferred into a ceramic container such as a usual ceramic bowl for noodles, to which is added hot water, and heated in a microwave oven as mentioned above. Hot water after cooking, i.e., used for boiling may be drained off, or may be added with soup and served.

To eat thick Chinese noodles (thickness of strand: 1.5×1.5 mm) by heating in a microwave oven, the conventional procedure is conducted except that flour used for the production of Chinese noodles is partially replaced with modified starch, for example, with an acetate ester of tapioca starch (20% by weight), and water to be added is changed to 43 to 45% by weight based on the powder.

Further, the aforementioned water to be added is partially substituted with ethanol (2 to 3% by weight) to improve the storage stability of fresh Chinese noodles (at 10 to 15° C.) by 2 to 3 times (3 to 4 weeks) compared with that of noodles without adding ethanol. Further, the kneading of natural antibacterial ingredients such as protamine, glycine, chitin, chitosan and water activity regulator into noodles, combined with a package containing an oxygen scavenger or a sustained release alcohol preparation will extend the storage period (one month or more) at ordinary temperature (20 to 30° C.).

According to the present invention, ready-to-eat fresh noodles having a taste and mouthfeel characteristic of fresh noodles, which can be conveniently cooked by heating in a microwave oven, can be obtained. Using fresh noodles with a moisture content of 30 to 50% by weight, cooked noodles with an especially good mouthfeel and taste can be obtained by a simple cooking process. In addition, ready-to-eat fresh noodles having an improved storage stability and excellent mouthfeel can be prepared using fresh noodles compounded with natural antibacterial ingredients and other stability improvers.

According to the present invention, 10 to 50% by weight of modified starch having a gelatinization initiation temperature of 50 to 60° C. and 0.5 to 5% by weight of wheat protein containing gliadin as a main ingredient based on the powdery starting materials were added to prepare a noodle sheet, to obtain fresh noodles having a good moldability and suitable for use in a microwave oven. Further, by adding an α-starch, noodles which can be cooked in a shorter time and are more suitable for cooking in a microwave oven can be obtained.

According to the present invention, freshly cooked noodles having a mouthfeel equivalent or superior to that of noodles cooked by heating with a gas heater, electric heater or the like, can be produced using a microwave machine as a cooking device.

According to the present invention, by placing the noodles in a container for food to be cooked in a microwave oven having a lid with an antifoamer coated or antifoamer-containing sheet adhered thereon, noodles which often boil over upon heating, particularly, fresh noodles can be safely boiled in a short time, are provided. By providing the inner lid with openings and/or slits, noodles which can be cooked without boil-over can be provided. Further, by providing the lid with openings or slits, the same object can be attained. Moreover, the combination of these features can provide safer and simpler cooking methods. In these methods, using a container made of foamed resin, the container will not become too hot, to provide a noodles product which can be conveniently handled.

EXAMPLE

The present invention will now be described in more detail with reference to the examples. In the following examples, '%' is based on weight unless otherwise described.

Example 26-1, Comparative Examples 26-1 and 26-2

8 kg of semi-strong flour mixed with 2 kg of an acetate ester of tapioca starch was charged in a kneader, to which was added a solution of 0.05 kg of common salt, 0.1 kg of kanfun and 300 ml of ethanol dissolved in 4 kg of water, and kneaded for 20 minutes, then made into a noodle-sheet of 6 to 7 mm thickness using a noodle-making machine. Subsequently, the noodle-sheet was enveloped in a plastic bag to prevent drying, and aged at room temperature for about one hour. While narrowing down the rolling, the noodle-sheet was repeatedly rolled to about 1.5 mm thickness. The noodle-sheet was cut using a machine for producing a brick of noodles having a #20 blade to obtain fresh Chinese noodles.

Ten sets of containers were prepared, in which each set contained 100 g of the fresh Chinese noodles and a soup base for Chinese noodles contained in a packet placed in the same containers made of heat resistant polystyrene paper covered with a lid. Separately, ten sets of the same fresh Chinese noodles contained in polystyrene bags with packets containing the aforementioned concentrated soup base for Chinese noodles were prepared (Comparative Example 26-1). In addition, commercially available fresh Chinese noodles of similar quality were prepared (Comparative Example 26-2). The fresh Chinese noodles were served to ten panelists to evaluate the taste and mouthfeel of products cooked in a microwave oven having an output of 500 W and heated for 60 seconds (Example 26-1) and products conventionally cooked using a pan and a gas heater (Comparative Examples 26-1 and 26-2). In the above process, boiling water was used and the water used for boiling was drained off.

The results are shown in Table 26-1. The results show that all ten panelists felt that the present products were very convenient and had an excellent mouthfeel characteristic of Chinese noodles, retaining its texture without losing its firmness upon boiling. The moisture content of the fresh Chinese noodles of the example was 34% by weight.

TABLE 26-1

|  | Ex. 26-1 | Comp. Ex. 26-1 | Comp. Ex. 26-2 |
| --- | --- | --- | --- |
| Cooking Time before eating | 1.5 min | 2.5 min | 3.5 min |
| Total cooking time | 2 to 3 min | 5.5 min | 6.5 min |
| Convenience | Excellent | Ordinary | Bad |
| Mouthfeel within 1 min after cooking | Retaining texture | Retaining texture | Ordinary |
| Mouthfeel of 10 minutes after cooking | Retaining texture | Losing firmness | Extremely bad |

Note: Total cooking time includes the time required for boiling, draining off hot water, adding soup base and ingredients, pouring hot water, etc., excluding the time required for eating.

The fresh Chinese noodles of Example 26-1 and Comparative Example 26-2 were placed in polystyrene bags and tested for shelf life in a thermoplastic chamber at 10° C. As a result, mold grew on the product of Comparative Example 26-2 in two weeks, while those of Example 26-1 were free from mold with a standard plate count of putrefaction below the standard, i.e., $1 \times 10^6$.

Example 26-2, Comparative Examples 26-3 and 26-4

A mixture comprising 5 kg of semi-strong flour an 4.3 kg of hydroxypropylated tapioca starch, 0.5 kg of an α-corn starch and 0.2 kg of gliadin was charged in a vacuum kneader, to which was added a solution of 0.1 kg of common salt dissolved in 4.5 kg of water and kneaded for 20 minutes and obtained a noodle-sheet of 7 to 10 mm thickness according to the conventional method. The noodle-sheet was aged at room temperature for one hour while preventing drying, rolled to about 2 mm thickness, cut using a #8 blade to obtain fresh udon-noodles. Separately, commercially available LL ready-to-eat fresh udon-noodles (manufactured by Nisshin Food Products Co., Ltd., GONBUTOUDON, Comparative Example 26-3) and commercially available fresh noodles (cut using #10 blade, Comparative Example 26-4) were prepared.

Each fresh udon-noodles were used to carry out a comparison test similar to that in Example 26-1. In this case, the fresh udon-noodles of Example 26-1 were heated in a microwave oven for 1.5 minutes, then hot water was drained off, and soup and hot water were added again and heated in a microwave oven for a minute. The commercially available fresh noodles were cooked according to the manufacturer's specifications.

The results are shown in Table 26-2. As is obvious from the results, the udon-noodles of Example 26-2 match LL ready-to-eat fresh type noodles in convenience, and have a taste and mouthfeel similar to those of the conventional fresh udon-noodles. The fresh udon has good mouthfeel similar to that of 'kamaage udon' (udon-noodles immediately after boiling). The moisture content of fresh udon of Example 26-2 was 37% by weight.

TABLE 26-2

|  | Ex. 26-2 | Comp. Ex. 26-3 | Comp. Ex. 26-4 |
| --- | --- | --- | --- |
| Cooking Time before eating | 3.0 min | 2.5 min | 25 min |
| Total cooking time | 3.5 min | 3.0 min | 30 min |
| Convenience | Excellent | Excellent | Bad |
| Mouthfeel | Similar to kamaage-udon | Similar to boiled udon | Similar to kamaage-udon |

Example 26-3, Comparative Examples 26-5 and 26-6

A mixture comprising 6.7 kg of strong flour, 3 of buckwheat flour and 0.3 kg of gliadin was charged in a kneader, to which was added a solution comprising 0.06 kg of chitosan, 0.02 kg of adipic acid and 0.04 kg of glycine dissolved in 4.0 kg of water. After kneading for 20 minutes, the product was cut into noodle strands using a #20 blade according to the conventional method to prepare Japanese soba, which was placed in a container as described in Example 26-1. Separately, commercially available LL ready-to-eat fresh-type soba (manufactured by Nisshin Food Products Co., Ltd., GANSOBA, Comparative Example 26-5) and fresh soba of a similar thickness (Comparative Example 26-6) were prepared.

Each Japanese soba was compared for cooking process and mouthfeel in the same manner as described in Example 1. In this case, the Japanese soba of Example 3 was heated in a microwave oven for 1.5 minutes, then hot water was drained off and soup and hot water were added again. A commercially available product (Comparative Example 26-5) was cooked according to the manufacturer's specifications.

The Japanese soba obtained in Example 26-3 and Comparative Example 26-6 were placed in resin bags, and Japanese soba of Example 26-3, packaged with an oxygen scavenger, were examined for stability at ambient temperature. The results are shown in Table 26-3. The fresh Japanese soba of Example 26-3 had a moisture content of 35% by weight.

TABLE 26-3

|  | Ex. 26-3 | Comp. Ex. 26-5 | Comp. Ex. 26-6 |
| --- | --- | --- | --- |
| Cooking Time before eating | 3.0 min | 2.5 min | 3.5 min |
| Total cooking time | 3.5 min | 3.0 min | 5.0 min |
| Convenience | Excellent | Excellent | Bad |
| Taste | Very good | Losing Firmness | Good |
| Storage stability | 2 weeks | 6 months | 2 days |
| Storage stability (with oxygen scavenger) | 4 weeks | — | — |

The storage stability is expressed as a period of time in which the products are free from mold, the standard plate count being not more than $1 \times 10^6$.

As is obvious from Table 26-3, the Japanese soba of Example 26-3 exhibits a convenience equal to that of LL ready-to-eat fresh-type noodles and mouthfeel the same as that of fresh soba, and further, it can be stored for a longer period of time compared with fresh soba (Comparative Example 26-6).

Example 26-4, Comparative Example 26-7

A mixture comprising 6.7 kg of strong flour, 3.0 kg of hydroxypropylated tapioca starch, 0.2 kg of gliadin and 0.1 kg of dried egg albumen powder was charged in a vacuum kneader, to which was added a solution of 0.1 kg of sodium bicarbonate dissolved in 4.2 kg of water, and kneaded for 20 minutes, then rolled using an ordinary roll-type noodle-making machine to prepare a noodle-sheet of 5 to 6 mm thickness, and matured at a room temperature for one hour. Subsequently, the sheet was rolled to 1.7 mm thickness, and cut using a #18 round blade to obtain fresh spaghetti (Example 26-4). Separately, quickly cookable dried spaghetti (manufactured by Oh'My Macaroni, Comparative Example 26-7) was prepared.

Each spaghetti was cooked in the same manner as in Example 26-1, and served with meat sauce and evaluated in a similar comparative test. In Example 26-4, a shallow bowl made of heat resistant polystyrene paper was used, and spaghetti was heated in a microwave oven under conditions the same as those in Example 26-1, and after the hot water was drained off, the spaghetti was dressed with meat sauce.

The results are shown in Table 26-4. As is obvious from Table 26-4, although the fresh spaghetti of Example 26-4 had a mouthfeel the same as that of boiled dry spaghetti, it required a very short time for cooking.

TABLE 26-4

|  | Ex. 26-4 | Comp. Ex. 26-7 |
| --- | --- | --- |
| Cooking Time before eating | 2.0 min | 10 min |
| Total cooking time | 2.5 min | 15 min |
| Convenience | Excellent | Bad |
| Taste and mouthfeel | Very good | Very good |

Example 26-5, Comparative Example 26-8

The fresh Chinese noodles obtained in Example 26-1 were used to carry out test for chow mein (Example 26-5). For comparison, commercially available steamed chow mein noodles were prepared (Comparative Example 26-8).

The fresh Chinese noodles were heated in a microwave oven in the same manner as in Example 26-1, then hot water was drained off, and mixed with powdery chow mein sauce to prepare chow mein. The commercially available steamed chow mein noodles were lightly fried on a hot plate according to the ordinary method, a small amount of water was added, and the noodles were steamed with a lid on, then dressed with powdered sauce.

The results are shown in Table 26-5. As is obvious from Table 26-5, chow mein in Example 26-5 had a mouthfeel and taste similar to those of the ordinary chow mein, and can be cooked very conveniently.

TABLE 26-5

|  | Ex. 26-5 | Comp. Ex. 26-8 |
| --- | --- | --- |
| Cooking Time before eating | 2.0 min | 5 min |
| Total cooking time | 2.5 min | 10 min |
| Convenience | Excellent | Bad |
| Taste and mouthfeel | Very good | Very good |

Examples 26-6 and 26-7, Comparative Example 26-9

A powdery mixture comprising 6.0 kg of semi-strong flour mixed with 3.8 kg of modified starch used in Example 1 and 0.2 kg of gliadin was charged in a kneader, to which was added a solution of 30 g of common salt and 40 g of kanfun dissolved in 4.5 kg of water and kneaded for 20 minutes, then made into a noodle-sheet of 6 to 7 mm thickness using a noodle-making machine.

Subsequently, the noodles were enveloped in a plastic bag to prevent drying, and aged at room temperature for about one hour. While narrowing down the sheet by rolling, the noodle-sheet was rolled to about 1.5 mm thickness. The noodle-sheet was cut using a machine for producing a brick of noodles with #20 blade to obtain fresh Chinese noodles. Separately, commercially available fresh Chinese noodles produced using #20 blade were prepared , Comparative Example 26-9.

150 g of the thus obtained fresh Chinese noodles were charged in a bowl made of heat resistant polystyrene paper, to which was added 400 g of hot water, covered with a lid and heated in a microwave oven (output 500 W) for 60 minutes, to which was added a concentrated soup base for Chinese noodles without draining the hot water to prepare cooked ramen-noodles (Example 26-6). 100 g of the same Chinese noodles were charged in a 600 ml commercially available container for 'nabeyaki udon' made of aluminum foil and cooked ramen-noodles (Example 26-7) were prepared in the same manner as in Example 26-6 except that the heating time in a microwave oven was changed to 90 seconds. According to the manufacturer's specifications, commercially available fresh Chinese noodles were boiled in boiling water for 3 minutes, the hot water was completely drained off and placed in a pre-warmed bowl containing soup to prepare cooked ramen-noodles (Comparative Example 26-9).

Ten panelists were asked to eat each cooked ramen-noodles. As a result of the evaluation, cooked ramen-noodles of the Example had a texture characteristic of ramen-noodles and required a longer time to lose their firmness upon boiling, compared with commercially available products.

Preparative Example 25-1 (Process for production of wheat protein containing gliadin as a main ingredient)

1 kg of powdered gluten (manufactured by Ogilby) was added to an acidic ethanol aqueous solution comprising 2 g of citric acid dissolved in 10 litter of 10 vol % of aqueous ethanol solution, and after stirring and extracting at room temperature for 2 hours, the supernatant separated by a centrifuge was concentrated, dried to yield about 400 g of protein containing gliadin as a main ingredient (protein content, 75%) (hereinafter abbreviated to gliadin protein).

Example 25-1, Comparative Examples 25-1 to 25-3

A powdery starting material comprising 5 kg of semi-strong flour mixed with 4.6 kg of modified starch (gelatinization initiation temperature, 58° C.; hydroxypropylated corn starch) and 400 g of gliadin protein was charged in a kneader. An aqueous solution comprising 200 g of common salt dissolved in 4.3 kg of water was added to the kneader, and kneaded for 20 minutes, then made into a noodle-sheet of 6 to 7 mm thickness using a noodle-making machine. Subsequently, the noodle-sheet was enveloped in a plastic bag to prevent drying, and aged at room temperature for about an hour. While narrowing down the sheet by rolling, the noodle-sheet was further rolled so as to be about 1.7 mm of thickness. The noodle-sheet was cut to form noodle strands by using a machine for producing a brick of noodles having a #12 blade to obtain fresh udon noodles. At the same time, fresh udon noodles were prepared in the same manner except that modified starch and gliadin protein were replaced by middle-strong flour (Comparative Example 25-1). In addition, fresh udon noodles were prepared as per Example 25-1 wherein gliadin protein was substituted by semi-strong flour (Comparative Example 25-2) and gliadin protein was substituted with gluten (Comparative Example 25-3).

Each fresh udon noodles were tested for moldability and flavor. For cooking and tasting test, 100 g of fresh noodles were placed in a 500 ml container made of foamed polystyrol, to which was added 300 ml of hot water at 95° C. from a thermos bottle, and the container was covered with a wrap film, and heated in a microwave oven for 90 seconds. Subsequently, hot water was removed, and about 250 ml of fresh hot water, 50 ml of concentrated soup for noodles and 10 g of curry seasoning were added, and the container was covered with a wrap film again and heated in a microwave oven to prepare curry udon noodles. The thus prepared curry udon noodles were subjected to the cooking and tasting test by 10 panelists to evaluate their flavor and mouthfeel.

As a result, for moldability, the present process and the process of Comparative Example 25-1 provided good results, while the processes of Comparative Examples 25-2 and 25-3 provided noodles with poor moldability, that is, noodle strands were broken. Particularly, in Comparative Example 25-2, the noodles were easily broken and failed to be molded into udon noodles. In the cooking and tasting test, all ten panelists had the evaluation of the curry udon noodles cooked and prepared according to the present invention as equivalent to kamaage-udon noodles both in texture and smoothness. On the other hand, the noodles of Comparative Examples 25-1 and 25-3 were evaluated as not being boiled in such a period, and were hard and deficient in smoothness, retaining a flour-like smell.

Subsequently, fresh udon noodles of Example 25-1 and Comparative Example 25-1 were compared for the time required for cooking using cold water. Each 100 g of udon noodles were placed in a 1,000 ml container suitable for use in a microwave oven, 400 ml of water was added thereto, and the time required for boiling in a microwave oven was measured. As the results, fresh udon noodles of Example 25-1 were boiled in about 5 minutes, while those of Comparative Example 25-1 required about twice the time, that is, 9 to 10 minutes in a microwave oven.

Example 25-2 and Comparative Example 25-4

A powdery starting, material formed by mixing 5 kg of middle-strong flour, 4.2 kg of modified starch used in Example 25-1, 500 g of α-corn starch and 300 mg of gliadin protein was placed in a kneader, to which was added an aqueous solution comprising 200 g of common salt and 90 g of sodium bicarbonate dissolved in 4.3 kg of water, kneaded for 20 minutes, and made into noodle sheet of 6 to 7 mm thickness using a noodle-making machine. Subsequently, the noodle sheet was enveloped in a plastic bag to prevent drying, and aged at room temperature for about an hour. While narrowing down the sheet by rolling, the noodle sheets was pressed to about 1.7 mm thickness. The noodle sheet was made into noodle strands using a machine to make a noodle brick with a #12 blade, to prepare fresh udon noodles. Similarly, gliadin protein and α-starch were replaced with wheat gluten and middle-strong flour, respectively, to prepare fresh udon noodles (Comparative Example 25-4).

For each udon noodles, moldability and cooking and tasting tests were performed. The cooking and tasting test was performed in the same manner as Example 25-1 except that the initial heating time in a microwave oven was changed to 90 seconds. As the results, the present process was excellent in moldability, while the method of Comparative Example 25-4 was inferior in moldability, providing fragile noodle strands. In the cooking and tasting tests, all ten panelists evaluated the curry udon noodles of Example 25-4 having a good texture and smoothness as that of 'kamaage udon' while the noodles of Comparative Example 25-4 were evaluated as insufficiently boiled, retaining a flour-like smell, hard and deficient in smoothness.

Example 25-3, Comparative Examples 25-5 and 25-6

A powdery starting material formed by mixing 6.8 kg of semi-strong flour, 3.0 kg of modified starch used in Example 25-1 and 200 g of gliadin protein was placed in a kneader, to which was added an aqueous solution comprising 100 g of common salt and 100 g of kanfun dissolved in 4.3 kg of water and kneaded for 20 minutes, and made into noodle sheet of 6 to 7 mm thickness using a noodle-making machine. The noodle sheet was enveloped in a plastic bag to prevent drying, and aged at room temperature for about one hour. Subsequently, while narrowing down the sheet by rolling, the noodle sheet was pressed so as to be about 1.5 mm thickness. The noodle sheet was made into noodle strands using a machine to make noodle brick with a #20 blade to prepare fresh Chinese noodles. Similarly, modified starch and gliadin protein were replaced with semi-strong flour to prepare fresh Chinese noodles (Comparative Example 25-5). In addition, wheat gluten was used instead of gliadin protein to produce fresh Chinese noodles (Comparative Example 25-6).

Each 150 g of Chinese noodles were placed in a 500 ml container made of foamed polystyrol, to which was added 300 ml of hot water at 95° C. from a thermos bottle, covered with a wrap film and heated in a microwave oven for 90 seconds, then the hot water was removed and about 250 ml of fresh hot water and 30 ml of concentrated Chinese soup base (soysauce-flavored) were added to prepare soysauce-flavored ramen noodles. The cooking and tasting test was performed for thus obtained ramen noodles to evaluate their flavor and mouthfeel.

As the results, all ten panelists had the evaluation that the soysauce-flavored Chinese noodles prepared according to the present method had a texture and smoothness equivalent to those of fresh Chinese noodles boiled using an ordinary gas heater, while the noodles of Comparative Examples 25-5 and 25-6 were not cooked and retained a flour-like smell, hard and deficient in smoothness.

Example 25-4

A powdery starting material formed by mixing 6.6 kg of semi-strong flour and 3.0 kg of modified starch used in Example 25-1, 200 g of α-starch used in Example 25-2 and 200 g of gliadin protein was placed in a kneader, to which was added an aqueous solution comprising 100 g of common salt and 100 g of kanfun dissolved in 4.5 kg of water, kneaded for 20 minutes, and made into a noodle sheet of 6 to 7 mm thickness using a noodle-making machine, the noodle sheet was enveloped in a plastic bag to prevent drying, and aged at room temperature for about one hour. Subsequently, while narrowing the nip of the press roll, the noodle sheet was pressed so as to be about 1.5 mm of thickness. The noodle sheet was made into noodle strands using a machine to make noodle brick with a #20 blade, to prepare fresh Chinese noodles.

The thus obtained Chinese noodles were subjected to the cooking and tasting test in the same manner as that in Example 25-3. As a result, the noodles of Example 25-3 required 90 seconds for heating in a microwave oven, while those of Example 25-4 became edible by heating for only 60 seconds. Although more water was added in the present Example compared with that in Example 25-3, the moldability was equivalent.

Example 25-5, Comparative Example 25-7

A powdery starting material formed by mixing of 3.3 kg of strong flour, 3.0 kg of buckwheat flour, 3.0 kg of modified starch used in Example 25-1, 400 g of gliadin protein and 300 g of α-corn starch was placed in a kneader, to which was added an aqueous solution comprising 100 g of common salt and 60 g of guar gum dissolved in 4.3 kg of water, kneaded for 20 minutes, and made into noodle sheet of 6 to 7 mm thickness using a noodle-making machine. The noodle sheet was enveloped in a plastic bag to prevent drying, and aged at a room temperature for about one hour. Subsequently, narrowing the sheet by rolling, the noodle sheet was pressed so as to be about 1.5 mm of thickness. The noodle sheet was made into noodle strands using a machine to make noodle brick with a #20 blade, to prepare fresh Japanese buckwheat noodles. Similarly, modified starch and α-starch were replaced with gliadin protein and strong flour, respectively, and guar gum was not added to produce fresh Japanese buckwheat noodles (Comparative Example 25-7).

Each 150 g of fresh Japanese buckwheat noodles were placed in a 500 ml container made of foamed polystyrol, to which was added 300 ml of hot water at 95° C. from a thermos bottle, covered with a wrap film and heated in a microwave oven for 60 seconds, then the hot water was removed and about 250 ml of fresh hot water and 30 ml of concentrated Chinese soup base (soysauce-flavored) were added to prepare kakesoba noodles. The cooking and tasting test was performed for thus obtained ramen noodles to evaluate their flavor and mouthfeel.

As a result, all ten panelists had the evaluation that the fresh buckwheat noodles prepared according to the present method had a texture and smoothness equivalent to those of fresh Japanese buckwheat noodles boiled using a conventional gas heater, while the noodles of Comparative Example 25-7 were not cooked and retained a flour-like smell, hard and deficient in smoothness.

Example 25-6

In the same manner as in Example 25-4, except that a portion of semi-strong flour (60 g) was substituted with dried egg albumen, fresh Chinese noodles were obtained. The fresh Chinese noodles and those from Example 25-4 were used and cooked in the same manner as in Example 25-4 and the thus obtained soysauce-flavored ramen noodles were tested for degradation of texture upon boiling.

As a result, the noodles of Example 25-6 were significantly controlled to become pasty after boiling compared with those of Example 25-4.

Example 31-1, Comparative Example 31-1

A powdery mixture comprising 7.5 kg of semi-strong flour, 2.5 kg of modified starch (MTO1H, manufactured by Nippon Shokuhin Kako) and 400 g of powdered oils and fats (Magic Fat 100, manufactured by Miyoshi Yushi KK) was charged in a kneader, to which was added an aqueous solution of 50 g of common salt and 100 g of kanfun (Hana-kanfun, manufactured by Taiyo Shokukagaku) dissolved in 3.5 kg of water, and kneaded for 20 minutes, then made into a noodle-sheet of 6 to 7 mm thickness using a noodle-making machine. Subsequently, the noodle-sheet was enveloped in a plastic bag to prevent drying, and aged at room temperature for about one hour. While narrowing down the rolling, the noodle-sheet was further rolled so as to be about 1.6 mm of thickness. The noodle-sheet was cut using a machine for producing a brick of noodles having a #20 blade to obtain fresh Chinese noodles. Similarly, fresh Chinese noodles were obtained without adding powdered oils and fats (Comparative Example 31-1).

Each 100 g of Chinese noodles was placed in a 500 ml container made of foamed polystyrol, to which was added 300 ml of hot water at 85° C. from a thermos bottle. The container was covered with a lid and heated in a microwave oven for 50 seconds, then some of concentrated Chinese soup was added to prepare Chinese noodles. The thus obtained Chinese noodles were evaluated for flavor and mouthfeel by ten panelists.

As a result, all ten panelists had the evaluation that the present product had a texture and smoothness equivalent or superior to ordinary Chinese noodles boiled by using a gas heater. On the other hand, the fresh noodles of Comparative Example 31-1 were not cooked and retained a flour-like smell, hard and deficient in smoothness.

Example 31-2 and Comparative Example 31-2

A powdery mixture comprising 6.7 kg of semi-strong flour, 2.5 kg of modified starch, 400 g of gliadin (Glia A, manufactured by Asama Kasei KK), 200 g of dried egg albumen powder and 200 9 of powdered oils and fats was charged in a kneader, to which was added an aqueous solution of 50 g of common salt and 100 g of kanfun dissolved in 3.5 kg of water and 300 ml of ethanol, and kneaded for 20 minutes and made into a noodle-sheet of 6 to 7 mm thickness. Subsequently, the noodle-sheet was enveloped in a plastic bag to prevent drying, and aged at a room temperature for about one hour. While narrowing down the sheet by rolling, the noodle-sheet was further rolled so as to be about 1.6 mm of thickness. The noodle-sheet was cut using a machine for producing a brick of noodles having a #20 blade to obtain fresh Chinese noodles. Similarly, fresh Chinese noodles were obtained without adding powdered oils and fats.

Each 150 g of Chinese noodles were placed in a 700 ml container made of foamed polystyrol resin, to which was added 400 ml of hot water at 85° C. from a thermos bottle, the container covered with a lid and heated in a microwave oven for 50 seconds, then 55 ml of concentrated Chinese soup was added to prepare Chinese noodles. The thus obtained Chinese noodles were evaluated for flavor and mouthfeel by ten panelists.

As a result, all ten panelists had the evaluation that the present products had a texture and smoothness equivalent or superior to ordinary Chinese noodles. On the other hand, the fresh noodles of Comparative Example 31-2 were not cooked and retained a flour-like smell, hard and deficient in smoothness. In addition, the present noodles did not become pasty and retained their texture ten minutes after cooking, in contrast with ordinary Chinese noodles.

Example 31-3 and Comparative Example 31-3

A powdery mixture comprising 5.8 kg of semi-strong flour, 4.0 kg of modified starch, 300 g of powdered oils and fats and 200 g of gliadin (Glia A) was charged in a kneader, to which was added an aqueous solution of 120 g of common salt and 20 g of sodium bicarbonate dissolved in 4.0 kg of water, and kneaded for 20 minutes and made into a noodle-sheet of 6 to 7 mm thickness. Subsequently, the noodle-sheet was enveloped in a plastic bag to prevent drying, and aged at a room temperature for about one hour. While narrowing down the sheet by rolling, the noodle-sheet was further rolled so as to be about 2.5 mm of thickness. The noodle-sheet was cut using a machine for producing a brick of noodles having a #12 blade to obtain fresh udon noodles. Similarly, fresh udon noodles were obtained without adding powdered oils and fats (Comparative Example 31-3).

Each 100 g of udon noodles was placed in a 500 ml container made of foamed polystyrol resin, to which was added 300 ml of hot water at 85° C. from a thermos bottle. The container was covered with a lid and heated in a microwave oven for 60 seconds, then 50 ml of concentrated udon soup and 300 ml of hot water were added and heated again in a microwave oven for 60 seconds, to prepare kamaage-udon noodles. The thus obtained kamaage-udon noodles were evaluated for flavor and mouthfeel by ten panelists.

As a result, all ten panelists had the evaluation that the present product had a texture and smoothness equivalent or superior to ordinary kamaage-udon noodles. On the other hand, the udon noodles of Comparative Example 31-2 were evaluated as being hard and deficient in smoothness.

Example 31-4 and Comparative Example 31-4

A powdery mixture comprising 6.0 kg of strong flour, 0.5 kg of modified starch, 3.0 kg of buckwheat flour, 300 g of powdered oils and fats and 300 g of gliadin (Glia A was charged in a kneader), to which was added an aqueous solution of 120 g of common salt and 30 g of sodium bicarbonate dissolved in 3.5 kg of water and kneaded for 20 minutes and made into a noodle-sheet of 6 to 7 mm thickness. Subsequently, the noodle-sheet was enveloped in a plastic bag to prevent drying, and matured at room temperature for about an hour. While narrowing down the sheet by rolling, the noodle-sheet was further rolled so as to be about 1.5 mm of thickness. This noodle-sheet was cut using a machine for producing a brick of noodles having a #20 blade to obtain fresh Japanese buckwheat noodles. Similarly, fresh Japanese buckwheat noodles were obtained without adding powdered oils and fats (Comparative Example 31-4).

Each 150 g of fresh Japanese buckwheat noodles were placed in a 700 ml container made of foamed polystyrol resin, to which was added 400 ml of hot water at 85° C. from a thermos bottle. The container was covered with a lid and heated in a microwave oven for 50 seconds, then washed with water to prepare morisoba noodles. The thus obtained morisoba noodles were evaluated for flavor and mouthfeel by ten panelists.

As a result, all ten panelists had the evaluation that the present product had a texture and smoothness equivalent or superior to ordinary morisoba noodles. On the other hand, the morisoba noodles of Comparative Example 31-4 were evaluated as being hard and deficient in smoothness.

Example 31-5, Comparative Example 31-5

A mixture comprising 5.8 kg of semi-strong flour, 4.0 kg of modified starch, 500 g of powdered oils and fats and 200 g of ASAMA GLUTENIN was charged in a kneader, to which was added a solution of 60 g of common salt and 30 g of sodium bicarbonate dissolved in 4.0 kg of water, and kneaded for 20 minutes, then rolled to prepare a noodle-sheet of 6 to 7 mm thickness. Subsequently, the noodle-sheet was enveloped in a plastic bag to prevent drying, and aged at room temperature for about one hour. While narrowing down the sheet by rolling, the noodle-sheet was further rolled so as to be about 1.7 mm of thickness, and cut using a #18 blade to obtain fresh spaghetti. Similarly, fresh spaghetti was prepared without adding powdered oils and fats (Comparative Example 31-5).

Each 100 g of fresh spaghetti was placed in a 500 ml container made of foamed polystyrol resin, to which was added 300 ml of hot water at 85° C from a thermos bottle, heated in a microwave oven for 120 seconds, the hot water was removed, 60 g of concentrated meat sauce was added and dressed spaghetti to prepare spaghetti with meat sauce. The thus obtained spaghetti with meat sauce was evaluated by ten panelists for flavor and mouthfeel.

As a result, all ten panelists had the evaluation that the present noodles had a texture and smoothness equivalent or superior to those of the freshly cooked spaghetti according to the ordinary cooking method, while the spaghetti of Comparative Example 31-5 was evaluated as being hard and unpalatable.

Example 33-1

A sheet of about 3.5 mm thickness which comprises foamed polystyrene sheet with both surfaces laminated with polystyrene films (hereinafter referred to as styrene paper) was molded into a bowl-shaped container having 17 cm of diameter, 6 cm of depth and 600 to 800 ml of capacity. Moreover, a biaxially oriented polystyrene sheet was molded into a lid which fits the aforementioned bowl. In this case, while molding the lid, steam vents having 15 mm of width and 1 mm of bulge are provided at 4 points at the engagement portion of the lid. 20 mg of antifoaming silicone oil was uniformly and entirely coated on the inner surface of the lid.

100 g of commercially available fresh Chinese noodles was placed in the container, into which was poured 300 g of hot water at 95° C. from a thermos bottle, covered with a lid, then heated in a household microwave oven (output 500 W) for 3 minutes.

As a result, the content was boiled within 70 seconds after initiation of heating. However, the content did not boil over until the heating was completed. Further, the container was not deformed, and did not become too hot to be handled with bare hands.

Example 33-2

The bowl and the lid used in Example 33-1 (only with steam vents) were used. A hole of 2 cm diameter was provided at the center of the lid, and doughnut-shaped paper having 4 cm of diameter and 1 cm of width was provided around the hole, the paper impregnated with 0.5 g of silicone oil used in Example 33-1 was adhered onto the inner wall of the hole.

In the same manner as in Example 33-1, 100 g of fresh Chinese noodles and 300 g of hot water were placed in the container, and heated similarly in a microwave oven for 3 minutes. As a result, the hot water or the noodles were boiled without boil-over.

Example 33-3

In addition to the container and the lid of Example 33-1 (only with steam vents), an inner lid which inclined in 1 cm beneath the top edge of the container was prepared from the same materials as for the lid. Holes having 1 cm of diameter were provided radially at 8 points on the inner lid. 100 g of commercially available fresh udon noodles which have been prepared by using a #12 blade, and 300 g of hot water at 90° C. was added to the container provided with an inner lid, then the container was covered with the inner lid and the lid, and heated in a microwave oven for 5 minutes. As a result, after boiling, hot water and a small amount of noodles were on the inner lid, but did not boil over from the container.

Example 33-4

The bowl, the lid and the inner lid of Example 33-3 were used. The inner lid (with holes) being entirely coated with an emulsifier (sorbitan fatty acid ester) having an HLB of 3 was prepared. Under conditions similar to those in Example 33-3, fresh udon noodles were heated in a microwave oven for 5 minutes. As a result, both hot water and udon noodles did not boil over.

Example 33-5 and Comparative Example 33-1

The container used in Example 33-1 and the lid in Example 33-1 were used except that the steam vents were not prepared. A cross-shaped slit having 2 cm of length was provided on the lid. Cooked noodles (NAGAMOCHIMEM-KAKEUDON, manufactured by Shimadaya KK), which hardly produce foam, were placed in this container (Example 33-5), into which was poured hot water, and heated in a microwave oven for 90 seconds. The thus obtained cooked udon noodles were compared with the udon noodles cooked using a gas heater, which is described in the manufacturer's specification (Comparative Example 33-1) by an organoleptic test by ten panelists. As a result, all ten panelists had the evaluation that both the texture and smoothness of the udon noodles of Example 33-5 were superior to those cooked using a pan and a gas heater.

Example 33-6

The inner lid used in Example 33-3 was provided with 80 holes, each hole having 3 mm of diameter. The container and the lid were the same as those used in Example 33-1. 100 g of dried spaghetti and 250 g of hot water were added to the container and boiled using microwave oven for 6 minutes.

As a result, the spaghetti was boiled in a shorter time as compared with the time described in the instruction attached to the product ('boil for 10 minutes'). Further, after boiling, the lid was removed and hot water was discarded with the inner lid on, using the inner lid as a strainer. The spaghetti was dressed with a spaghetti sauce and delicious spaghetti was provided.

What is claimed is:

1. A method for rapid cooking of fresh noodles in a microwave oven, the noodles havino a water content of from 30 to 50 wt. % and formed from starting materials comprising 10 to 50 wt. % modified starch having a gelatinization initiation temperature of 50 to 60° C.; 0.5 to 5 wt. % wheat protein containing gliadin as a main component; and 1 to 10 wt. % of an $\alpha$-starch, the method comprising the steps of:

placing said noodles in a microwave resistant container or bag; and heating said noodles in said microwave oven for a time sufficient to reproduce mouthfeel and taste characteristics of fresh noodles.

2. The method for rapid cooking according to claim 1, wherein said noodles are heated for 60 to 90 seconds.

3. The method for rapid cooking fresh noodles according to claim 1, further comprising adding heated water into the container or bag containing the noodles and heating in the microwave oven.

4. The method for rapid cooking fresh noodles according to claim 1, wherein the noodles are transferred into a ceramic container from the container or bag, and heated in the microwave oven.

* * * * *